(12) United States Patent
Zhang

(10) Patent No.: US 12,432,141 B2
(45) Date of Patent: Sep. 30, 2025

(54) TRANSPORT OF VPN TRAFFIC WITH REDUCED HEADER INFORMATION

(71) Applicant: Juniper Networks, Inc., Sunnyvale, CA (US)

(72) Inventor: Zhaohui Zhang, Westford, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 287 days.

(21) Appl. No.: 17/937,193

(22) Filed: Sep. 30, 2022

(65) Prior Publication Data

US 2024/0098020 A1 Mar. 21, 2024

Related U.S. Application Data

(60) Provisional application No. 63/265,879, filed on Dec. 22, 2021.

(51) Int. Cl.
*H04L 45/74* (2022.01)
*H04L 45/50* (2022.01)
*H04L 69/16* (2022.01)

(52) U.S. Cl.
CPC ........... *H04L 45/74* (2013.01); *H04L 45/50* (2013.01); *H04L 69/16* (2013.01)

(58) Field of Classification Search
CPC ......... H04L 45/74; H04L 45/50; H04L 69/16; H04L 12/4645; H04L 12/4666; H04L 45/00; H04L 49/3009; H04L 69/22; H04L 45/02
See application file for complete search history.

(56) References Cited

U.S. PATENT DOCUMENTS

| | | | |
|---|---|---|---|
| 2007/0112975 A1* | 5/2007 | Cassar | H04L 12/4633 709/239 |
| 2016/0315853 A1* | 10/2016 | Liste | H04L 63/10 |
| 2023/0370358 A1 | 11/2023 | Song et al. | |

FOREIGN PATENT DOCUMENTS

| | | |
|---|---|---|
| CN | 112511423 A | 3/2021 |
| CN | 113630373 A | 11/2021 |
| EP | 3907962 B1 | 3/2023 |

OTHER PUBLICATIONS

Extended European Search Report for Application No. EP22213840.6, mailed on Apr. 6, 2023, 15 pages.

(Continued)

*Primary Examiner* — Ian N Moore
*Assistant Examiner* — Latresa A McCallum
(74) *Attorney, Agent, or Firm* — Harrity & Harrity, LLP

(57) ABSTRACT

In some implementations, a first PE network device may receive, from a first CE network device, traffic that includes at least an IP header. The first PE network device may determine whether the first PE network device is to remove the IP header, or the IP header and a UDP header included in the traffic, from the traffic. The first PE network device may send, to one or more second PE network devices, the traffic, wherein the first PE network device, prior to sending the traffic, updates the traffic by removing the IP header, or the IP header and a UDP header, when the first PE network device makes a removal determination, and wherein the first PE network device, prior to sending the traffic, does not update the traffic when the first PE network device does not make a removal determination.

20 Claims, 11 Drawing Sheets

(56) References Cited

OTHER PUBLICATIONS

Jerry A., et al., "End-to-End VoIP Header Compression Using cRTP draft-ash-e2e-crtp-hdr-compress-01.txt," Internet Engineering Task Force, Mar. 2003, 9 pages, XP015000136.
Jerry A., et al., "End-to-End VoIP over MPLS Header Compression; draft-ash-e2e-vompls-hdr-compress-00.txt," Internet Engineering Task Force, Nov. 2002, 14 pages, XP015010366.
Ash, J., et al., "Hand, End-to-End VoIP Header Compression Using cRTP," Networking Group, Mar. 2003, pp. 1-8.

* cited by examiner

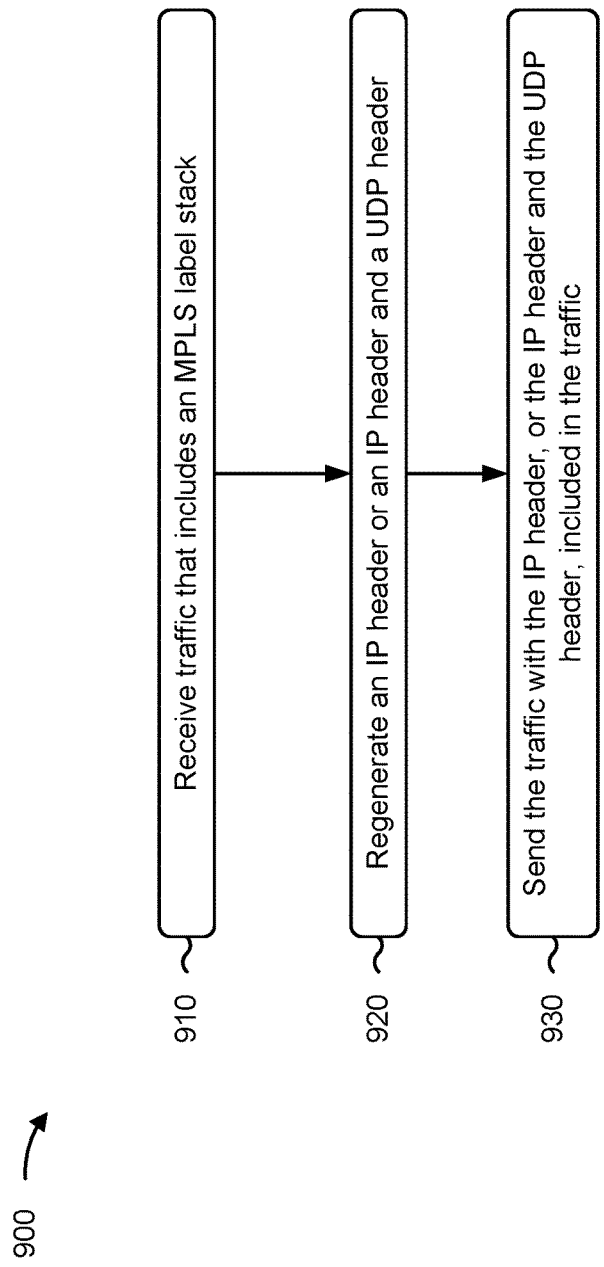

TRANSPORT OF VPN TRAFFIC WITH REDUCED HEADER INFORMATION

CROSS-REFERENCE TO RELATED APPLICATION

This application claims priority to U.S. Patent Application No. 63/265,879, entitled "PSEUDOWIRE FOR INTERNET PROTOCOL OR USER DATAGRAM PROTOCOL PAYLOAD WITHOUT HEADERS," and filed on Dec. 22, 2021. The entire content of the above-referenced application is expressly incorporated herein by reference.

BACKGROUND

A virtual private network (VPN) may provide a virtual multipoint bridged connectivity between different Layer 2 domains, such as over an Internet protocol (IP) or an IP/multiprotocol label switching (MPLS) backbone network. VPN instances are configured on provider edge (PE) network devices (e.g., routers, switches, and/or the like) to maintain logical service separation between customer endpoint devices. The PE network devices connect to customer edge (CE) network devices (e.g., routers, switches, host devices, and/or the like). In some cases, a CE network device may be a network function (NF) element of a cellular network (e.g., a fifth generation (5G) network or a fourth generation (4G) network).

SUMMARY

In some implementations, a method includes receiving, by a first PE network device associated with a VPN and from a first CE network device, traffic that includes at least an IP header; determining, by the first PE network device, whether the first PE network device is to remove the IP header, or the IP header and a UDP header included in the traffic, from the traffic; and sending, by the first PE network device and to one or more second PE network devices, the traffic, wherein the first PE network device, prior to sending the traffic, updates the traffic by removing the IP header, or the IP header and a UDP header, when the first PE network device makes a removal determination, and wherein the first PE network device, prior to sending the traffic, does not update the traffic when the first PE network device does not make a removal determination.

In some implementations, a method includes receiving, by a first PE network device associated with a VPN and from a second PE network device, traffic that includes an MPLS label stack; regenerating, by the first PE network device and based on an inner label of the MPLS label stack, an IP header, or an IP header and a UDP header; and sending, to a CE network device, the traffic with the IP header, or the IP header and the UDP header, included in the traffic.

In some implementations, a first PE network device associated with a VPN includes one or more memories; and one or more processors to: receive, from a first CE network device, traffic that includes at least an IP header; determine whether the first PE network device is to remove the IP header, or the IP header and a UDP header included in the traffic, from the traffic; and send, to one or more second PE network devices, the traffic, wherein the first PE network device, prior to sending the traffic, updates the traffic by removing the IP header, or the IP header and a UDP header, when the first PE network device makes a removal determination, and wherein the first PE network device, prior to sending the traffic, does not update the traffic when the first PE network device does not make a removal determination.

In some implementations, a method includes receiving, by a network device and from another network device, virtual private network (VPN) traffic; identifying, by the network device, a label included in the VPN traffic; identifying, by the network device and based on the label, an entry in a data structure; updating, by the network device and based on the entry in the data structure, the VPN traffic by: removing at least the label from the VPN traffic, and including in the VPN traffic at least IP header information indicated by the entry; and forwarding, by the network device, after updating the VPN traffic, and to another device, the VPN traffic.

In some implementations, a network device includes one or more memories; and one or more processors to: receive, from another network device, VPN traffic; identify IP header information and user datagram protocol (UDP) header information included in the VPN traffic; identify, based on the IP header information and the UDP header information, an entry in a data structure; update, based on the entry in the data structure, the VPN traffic by: removing at least the IP header information from the VPN traffic, and including at least a label indicated by the entry in the VPN traffic; and forward, after updating the VPN traffic and to another network associated with the entry, the VPN traffic.

In some implementations, a non-transitory computer-readable medium storing a set of instructions includes one or more instructions that, when executed by one or more processors of a network device, cause the network device to: send, to another network device, an advertisement message, wherein the advertisement message includes a label, a route distinguisher, and traffic information that indicates at least a destination IP address; and update a data structure to include an entry, wherein the entry includes the label, the route distinguisher, and reconstruction information that includes at least IP header information, wherein the IP header information includes the destination IP address.

BRIEF DESCRIPTION OF THE DRAWINGS

FIGS. 6-9 are flowcharts of example processes related to transport of VPN traffic with reduced header information.

DETAILED DESCRIPTION

Figure 1A:
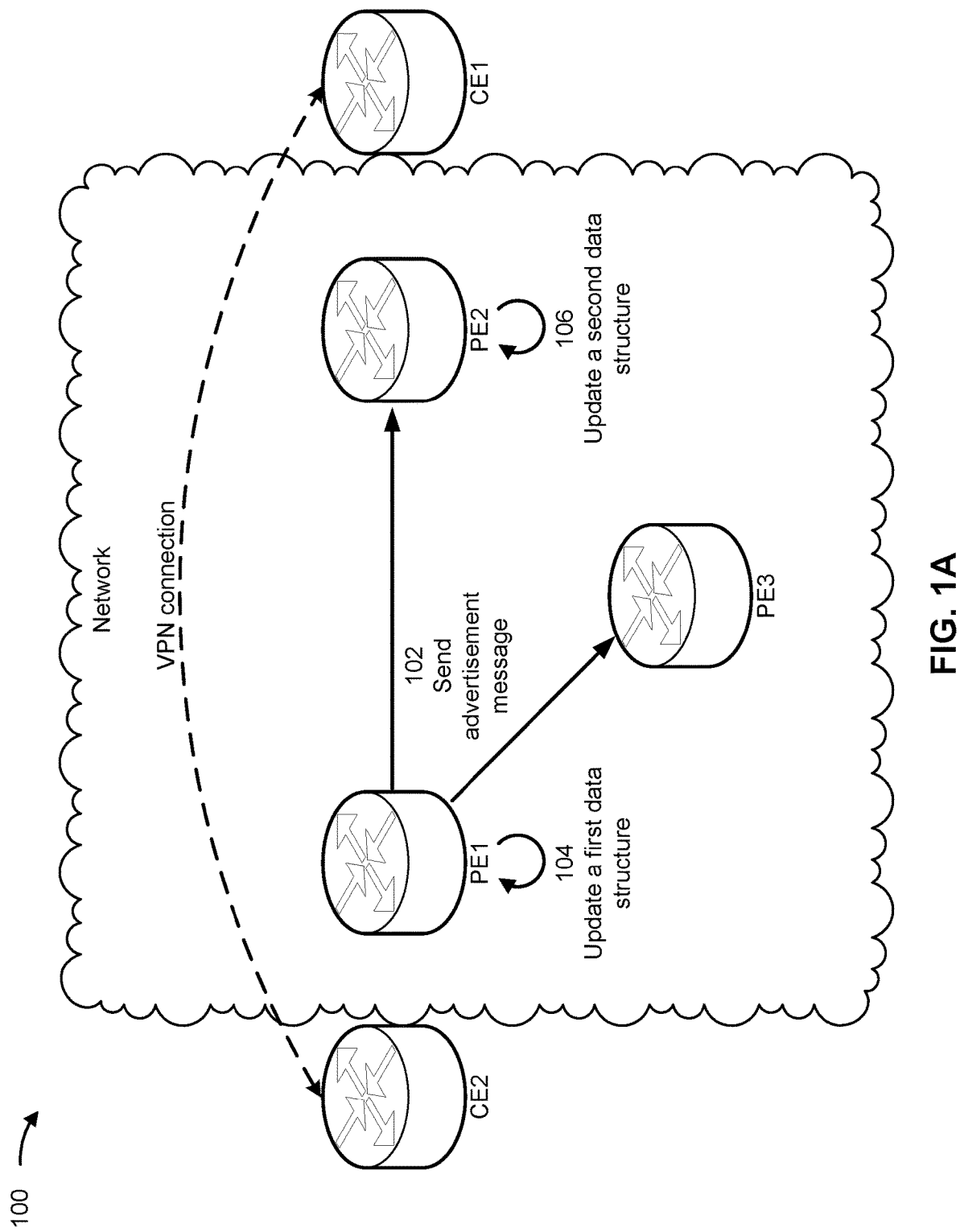
FIGS. 1A-1C are diagrams of one or more example implementations described herein.

The following detailed description of example implementations refers to the accompanying drawings. The same reference numbers in different drawings may identify the same or similar elements.

In some cases, CE network devices communicate with each other (e.g., via one or more PE network devices) via general packet radio service (GPRS) tunneling protocol (GTP) tunnels. To do so, a source CE device encapsulates GTP traffic with an IP header, a user datagram protocol (UDP) header, and a GTP header to enable transmission of the traffic via the one or more PE network devices to a destination CE device. However, when the CE network devices communicate GTP traffic via an IP data plane (e.g., that supports IPv6 and/or segment routing (SR) v6), an ingress PE network device must add an IPv6 header to the GTP traffic (e.g., in addition to the IP header, the user datagram protocol header, and the GTP header) to route the GTP traffic to an egress PE network device. This increases a size of the GTP traffic, which increases usage of computing resources (e.g., processing resources, memory resources, communication resources, and/or power resources, among other examples) of the PE network devices to process and forward the GTP traffic between the CE devices and/or impacts a performance of the PE network devices (e.g., in terms of a bandwidth performance, a latency performance, and/or a reliability performance, among other examples).

In some implementations described herein, CE network devices communicate with each other (e.g., via one or more PE network devices) via VPN connections (e.g., over an MPLS data plane, an IP data plane, or another data plane). For example, a first PE network device advertises (e.g., sends) an advertisement message that advertises a label (e.g., that is associated with a source CE network device; a destination CE network device; and/or a payload type, such as an IP and/or UDP payload type). The source CE network device then sends VPN traffic (e.g., that is associated with a VPN connection, that is destined for the destination CE network device, and that includes IP header information and UDP header information) to the second PE network device. The second PE network device, based on the advertisement message provided by the first PE network device, removes the IP header information (and, in some implementations, the UDP header information) from the VPN traffic and includes the label in the VPN traffic. The second PE network device then transmits the VPN traffic to the first PE network device. The first PE network device receives the VPN traffic and, based on the label included in the VPN traffic, adds the IP header information (and, in some implementations, the UDP header information) to the VPN traffic, and removes the label from the VPN traffic. The first PE network device transmits the traffic to the destination CE network device.

In this way, some implementations described herein enable transmission of VPN traffic between PE network devices without header information (e.g., without IP header information, and, in some implementations, UDP header information). This reduces a size of the VPN traffic (e.g., that still includes a payload), which decreases a usage of computing resources (e.g., processing resources, memory resources, communication resources, and/or power resources, among other examples) of the PE network devices to process and forward the VPN traffic between the CE devices (e.g., as compared to processing and forwarding traffic that includes the header information). Moreover, this improves a performance of the PE network devices (e.g., in terms of a bandwidth performance, a latency performance, and/or a reliability performance, among other examples) as compared to PE devices that process and forward traffic that includes the header information.

Figure 1B:
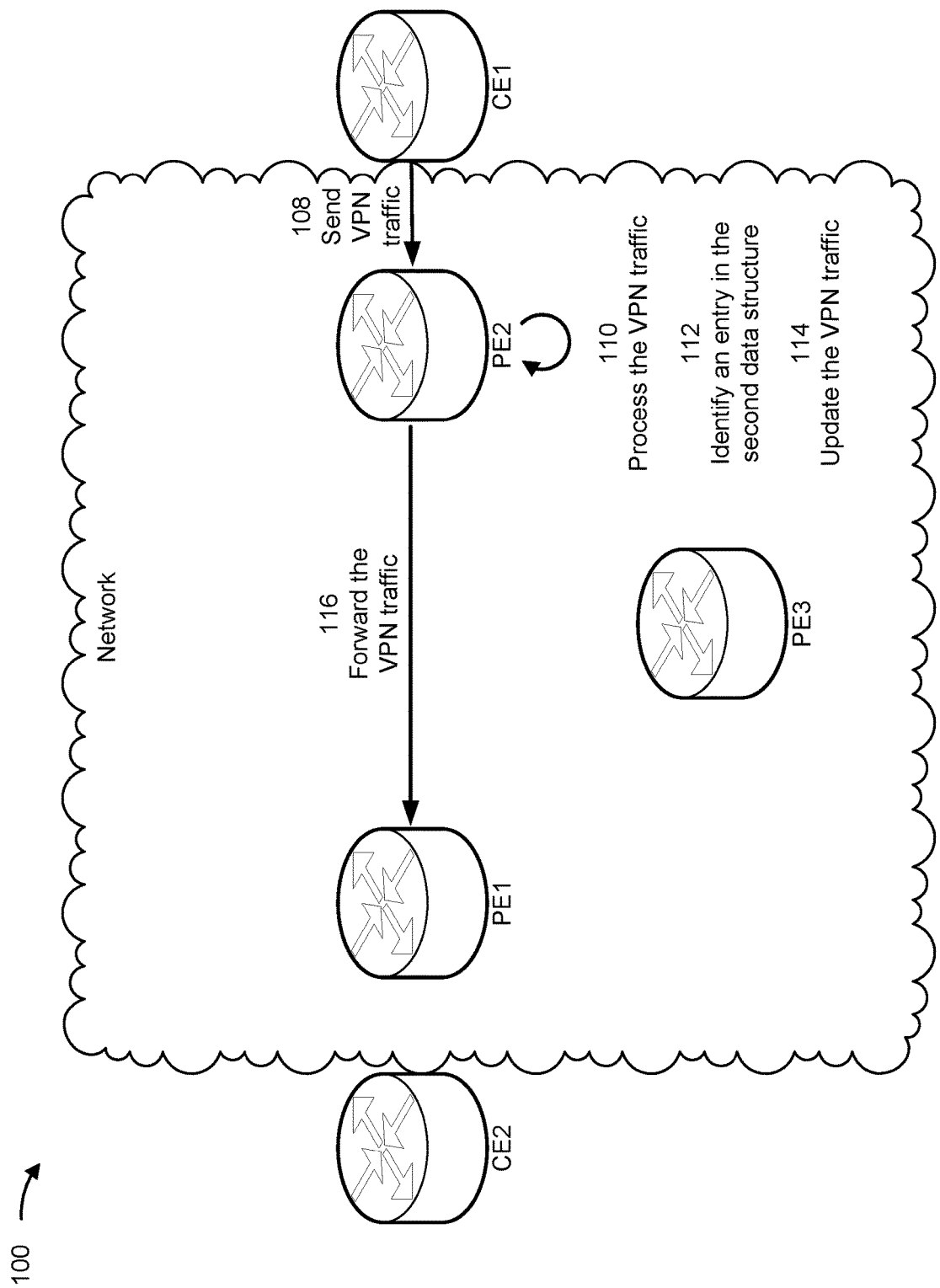
Figure 1C:
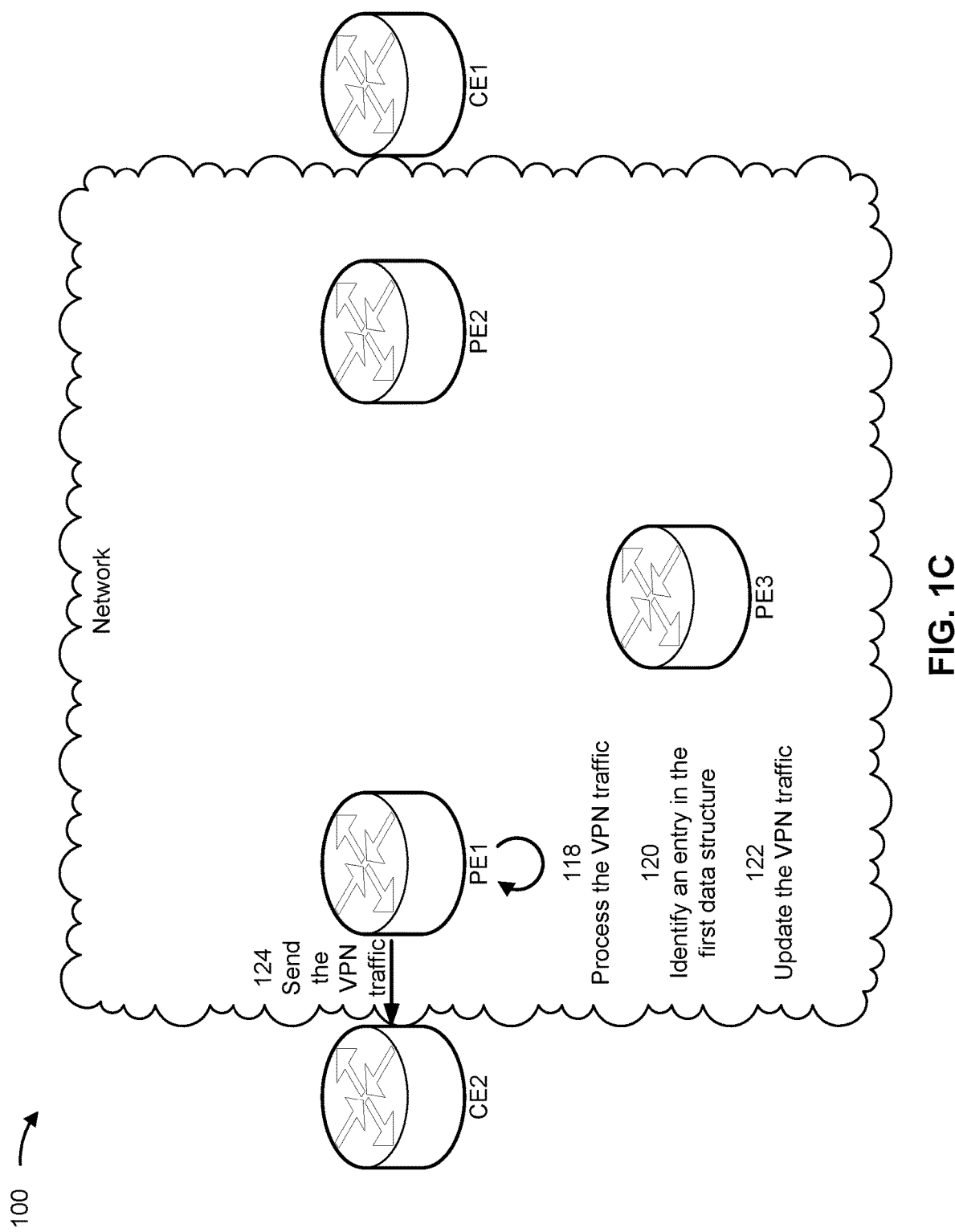

FIGS. 1A-1C are diagrams of one or more example implementations 100 described herein. Example implementation(s) 100 may include a source CE network device CE1, a destination CE network device CE2, and a plurality of PE network devices (shown as PE network devices PE1 through PE3 in FIGS. 1A-1C) in a network, which are described in more detail below in connection with FIGS. 2-4. As shown in FIG. 1A, a VPN connection (e.g., an IP-VPN connection) may be established between the source CE network device CE1 and the destination CE network device CE 2. Accordingly, VPN traffic (e.g., IP-VPN traffic) may be communicated between the source CE network device CE1 and the destination CE network device CE 2 via the plurality of network devices as described herein.

As shown in FIG. 1A, and by reference number 102, the PE network device PE1 may send an advertisement message (also referred to herein as an advertisement), such as to one or more other PE network devices of the plurality of PE network devices. For example, the PE network device PE1 may advertise the advertisement message to the one or more other PE network devices (e.g., according to a protocol, such as a border gateway protocol (BGP) or an interior gateway protocol (IGP)). The PE network device PE1 may send the advertisement message via a control plane of the network associated with the plurality of PE network devices. In some implementations, a controller (e.g., another network device) associated with the network may advertise the advertisement message to the PE network device PE1 and to the one or more other PE network devices.

The advertisement message may include a label (e.g., a multiprotocol label switching (MPLS) label or another label, also referred to herein as an inner label), a route distinguisher (RD), and/or traffic information. The RD may be associated with the VPN connection (shown in FIG. 1A) between the source CE network device CE1 and the destination CE network device CE 2. The traffic information may include a destination IP address (e.g., an IP address of the destination CE network device CE2, also termed DST-IP), and may additionally include a source IP address (e.g., an IP address of the source CE network device CE1, also termed SRC-IP), a source UDP address (e.g., a UDP port of the source CE network device CE1 also termed SRC-UDP), and/or a destination UDP address (e.g., a UDP port of the destination CE network device CE2, also termed DST-IP). The advertisement message may be formatted as a tuple of fields, such as (label, RD, DST-IP, SRC-IP, SRC-UDP, DST-UDP), where SRC-IP, SRC-UDP, and DST-UDP are optional fields. In some implementations, one or more of the SRC-IP, DST-IP, SRC-UDP, or DST-UDP may have a particular value (e.g., a particular IP address or a particular UDP port). Additionally, or alternatively, one or more of the SRC-IP, DST-IP, SRC-UDP, or DST-UDP may have a "wildcard" value (e.g., an asterisk or other wildcard value) that represents any value (e.g., any IP address or any UDP port).

As shown by reference number 104, the PE network device PE1 may update a first data structure (e.g., a database, a table, a file, and/or another data structure) that is included in and/or is accessible to the PE network device PE1. For example, the PE network device PE1 may update the first data structure based on, or in association with, sending the advertisement message (or based on receiving the advertisement message from the controller). The first data structure may be for the VPN (e.g., that is maintained by the PE network device PE1), and/or may be a routing and forwarding table of the PE network device PE1, such as a virtual routing and forwarding table or a global routing and forwarding table of the PE network device PE1.

The PE network device PE1 may update the first data structure to cause the first data structure to include an entry, such that the entry includes the label, the RD, and/or reconstruction information. The reconstruction information may include the traffic information. Additionally, or alternatively, the reconstruction information may include IP header information, and may additionally include UDP header information. The IP header information may include the destination IP address (e.g., DST-IP) included in the traffic information, and may additionally include the source IP address (e.g., SRC-IP), such as when the traffic information includes the source IP address. The UDP header information may include the destination UDP address (e.g., DST-UDP), such as when the traffic information includes the destination UDP address, and may additionally include the source UDP address (e.g., SRC-UDP), such as when the traffic information includes the source UDP address. The entry may be formatted as a tuple of fields, such as (label, RD, DST-IP, SRC-IP, SRC-UDP, DST-UDP), where SRC-IP, SRC-UDP, and DST-UDP are optional fields. In this way, the entry indicates that the label is associated with the RD and the reconstruction information.

As shown by reference number 106, the PE network device PE2 may receive the advertisement message from the PE network device PE1 (or from the controller, not shown), and therefore may update a second data structure (e.g., a database, a table, a file, and/or another data structure) that is included in and/or is accessible to the PE network device PE2. The second data structure may be for the VPN (e.g., that is maintained by the PE network device PE2), and/or may be a routing and forwarding table of the PE network device PE2, such as a virtual routing and forwarding table or a global routing and forwarding table of the PE network device PE2.

The PE network device PE2 may update the second data structure to cause the second data structure to include an entry, such that the entry includes the label, the RD, and/or the traffic information (e.g., that are included in the advertisement message). As described above, the traffic information may include the destination IP address (e.g., DST-IP), and may additionally include the source IP address (e.g., SRC-IP), the source UDP address (e.g., SRC-UDP), and/or the destination UDP address (e.g., DST-IP). Accordingly, the entry may be formatted as a tuple of fields, such as (label, RD, DST-IP, SRC-IP, SRC-UDP, DST-UDP), where SRC-IP, SRC-UDP, and DST-UDP are optional fields. In this way, the PE network device PE2 may be configured to process VPN traffic that matches some or all of the information included in the entry, as described herein.

As shown in FIG. 1B, and by reference number 108, the source CE network device CE1 may send VPN traffic (e.g., IP-VPN traffic, also referred herein as traffic) that is destined for the destination CE network device CE2. For example, the source CE network device CE1 may send the VPN traffic via the VPN connection (shown in FIG. 1A) between the source CE network device CE1 and the destination CE network device CE 2. Accordingly, the PE network device PE2 may receive the VPN traffic (e.g., as an ingress point of the VPN connection). The VPN traffic may include IP header information, or IP header information and UDP header information, and a payload. The IP header information (also referred to herein as an IP header) may include a destination IP address and a source IP address. The UDP header information (also referred to herein as a UDP header) may include a destination UDP address and a source UDP address.

As shown by reference number 110, the PE network device PE2 may process the VPN traffic. For example, the PE network device PE2 may parse and/or read the VPN traffic to identify the IP header information and the UDP header information included in the VPN traffic.

As shown by reference number 112, the PE network device PE2 may identify an entry in the second data structure (e.g., based on the IP header information and the UDP header information included in the VPN traffic). For example, the PE network device PE2 may search the second data structure to find an entry that includes information that matches the IP header information and the UDP header information. As a specific example, the PE network device PE2 may identify the entry in the second data structure that includes the label, the DT, and the traffic information (e.g., that were included in the advertisement message sent by the PE network device PE1, as described herein in relation to FIG. 1A) when the IP header information (that includes the destination IP address and the source IP address) and/or the UDP header information (that includes the destination UDP address and the source UDP address) included in the VPN traffic matches one or more corresponding fields of the tuple of fields (label, RD, DST-IP, SRC-IP, SRC-UDP, DST-UDP) of the entry.

As shown by reference number 114, the PE network device PE2 may update the VPN traffic (e.g., based on the entry in the second data structure). For example, the PE network device PE2 may update the VPN traffic, as further described herein, based on successfully identifying the entry in the second data structure. Alternatively, when the PE network device PE2 does not successfully identify an entry in the second data structure (e.g., when no entry of second data structure includes information that matches the IP header information and the UDP header information of the VPN traffic), the PE network device PE2 may refrain from updating the VPN traffic and may forward the VPN traffic, un-updated (as described herein), to another PE network device of the plurality of PE network devices. In this way, the PE network device PE2 may determine whether to remove the IP header information, or the IP header information and the UDP header information, from the traffic (e.g., as described herein).

In some implementations, the PE network device PE2 may update the VPN traffic by removing the IP header information from the VPN traffic. Additionally, in some implementations, the PE network device PE2 may update the VPN traffic by also removing the UDP header information. For example, the PE network device PE2 may identify the traffic information included in the entry of the second data structure (e.g., by parsing and/or reading the entry). Accordingly, the PE network device PE2 may determine whether the whether the traffic information includes a source UDP address (e.g., SRC-UDP) and/or a destination UDP address (e.g., DST-UDP). The PE network device PE2 may determine that the traffic information includes at least one of the source UDP address or the destination UDP address (e.g., includes at least one of SRC-UDP or DST-UDP) and may thereby remove the IP header information and the UDP header information from the VPN traffic (e.g., because the traffic information includes at least some UDP information). Alternatively, the PE network device PE2 may determine that the traffic information does not include a source UDP address and a destination UDP address (e.g., does not include SRC-UDP and DST-UDP) and may thereby remove the IP header information (and not the UDP header information) from the VPN traffic (e.g., because the traffic information does not include UDP information).

In some implementations, the PE network device PE2 may update the VPN traffic by including the label included in the entry of the second data structure in the VPN traffic (e.g., to indicate that the IP header information, and, in some implementations, the UDP header information has been removed from the VPN traffic). For example, the PE network device PE2 may update the VPN traffic to include an MPLS label stack that includes the label as an inner label of the MPS label stack. In this way, the label is for regeneration of a new IP header, or a new IP header and a new UDP header, by a PE network device that receives the VPN traffic.

Additionally, in some implementations, the PE network device PE2 may update the VPN traffic by including a control word in the VPN traffic. The control word may be included to prevent intermediate PE network devices (e.g., that receive and forward the VPN traffic between the PE network device PE2 and the PE network device PE1) from mistaking the VPN traffic as IP traffic or other non-updated VPN traffic. For example, the control word may have a first nibble set to 0 to indicate that the VPN traffic is updated VPN traffic.

As shown by reference number 116, the PE network device PE2 may forward (e.g., send) the VPN traffic (e.g., after updating the VPN traffic). In some implementations, the PE network device may forward the VPN traffic to another PE network device associated with the entry in the second data structure. For example, the PE network device PE2 may determine, based on the label, the DT, and/or the and the traffic information of the entry, that the PE network device PE1 is associated with the entry, and may therefore forward the VPN traffic to the PE network device PE1. In some implementations, the PE network device PE2 may forward the VPN traffic to another PE network device (e.g., PE network device PE3), to permit the VPN traffic to be forwarded to the PE network device PE1.

Accordingly, the PE network device PE1 may receive the VPN traffic (e.g., as an egress point of the VPN connection), either directly, or indirectly, from the PE network device PE2. Because the VPN traffic has been updated by the PE network device PE2, the VPN traffic may include a label (e.g., as an inner label of a MPLS label stack of the VPN traffic) (and, in some implementations, a control word) and may not include IP header information (and, in some implementations, may not include UDP header information).

As shown in FIG. 1C, and by reference number 118, the PE network device PE1 may process the VPN traffic. For example, the PE network device PE1 may parse and/or read the VPN traffic to identify the label in the VPN traffic (e.g., in the MPLS label stack of the VPN traffic). In some implementations, the PE network device PE1 may parse and/or read the VPN traffic to identify the label and the control word in the VPN traffic.

As shown by reference number 120, the PE network device PE1 may identify an entry in the first data structure (e.g., based on the label in the VPN traffic). For example, the PE network device PE1 may search the first data structure to find an entry that includes a label that matches the label in the VPN traffic. As a specific example, the PE network device PE1 may identify the entry in the first data structure that includes the label, the DT, and the reconstruction information described herein in relation to FIG. 1A and reference number 104.

As shown by reference number 122, the PE network device PE1 may update the VPN traffic (e.g., based on the entry in the first data structure). For example, the PE network device PE1 may update the VPN traffic, as further described herein, based on successfully identifying the entry in the first data structure. Alternatively, when the PE network device PE1 does not successfully identify an entry in the first data structure (e.g., when no entry of first data structure includes information that matches the label and/or the RD of the VPN traffic), the PE network device PE1 may refrain from updating the VPN traffic. For example, the PE network device PE may forward the VPN traffic, un-updated, to another network device, such as the destination CE network device CE2, or, alternatively, may drop the VPN traffic.

In some implementations, the PE network device PE1 may update the VPN traffic by removing the label from the VPN traffic (e.g., by removing the label from the MPLS label stack of the VPN traffic). Additionally, in some implementations, the PE network device PE1 may update the VPN traffic by also removing the control word from the VPN traffic (e.g., when the control word is included in the VPN traffic).

In some implementations, the PE network device PE1 may update the VPN traffic by including the reconstruction information included in the entry of the first data structure (e.g., that was identified by the PE network device PE1) in the VPN traffic. As described above in relation to FIG. 1A and reference number 104, the reconstruction information may include IP header information. Accordingly, the PE network device PE1 may update the VPN traffic by including the IP header information. The IP header information may include the destination IP address (e.g., DST-IP), and may additionally include the source IP address (e.g., SRC-IP). The PE network device PE1 therefore may update the VPN traffic to include the destination IP address (e.g., DST-IP) and, in some implementations, the source IP address (e.g., SRC-IP). Additionally, in some implementations, as further described above in relation to FIG. 1A and reference number 104, the reconstruction information may include UDP header information. Accordingly, the PE network device PE1 may update the VPN traffic by including the IP header information and the UDP header information. The UDP header information may include the destination UDP address (e.g., DST-UDP), and may additionally include the source UDP address (e.g., SRC-UDP). The PE network device PE1 therefore may update the VPN traffic to further include the destination UDP address (e.g., DST-UDP), and in some implementations, the source UDP address (e.g., SRC-UDP). In this way, the PE network device PE1 may regenerate a new IP header, or a new IP header and a new UDP header, and include them in the VPN traffic.

In a particular example, when the reconstruction information includes UDP header information that includes the source UDP address (and therefore also includes the destination UDP address), the PE network device PE1 may update the VPN traffic by including the IP header information and the UDP header information. As another example, when the reconstruction information includes UDP header information that includes the destination UDP address, and not the source UDP address (or the source UDP address has a wildcard value), the PE network device PE1 may update the VPN traffic by including the IP header information and the UDP header information (e.g., that includes the destination UDP address), and a particular source UDP address (e.g., that is not indicated by the UDP header information). The particular source UDP address may be a pre-configured value (e.g., that is based on configuration information of the PE network device PE1). As another example, when the reconstruction information includes IP header information that includes the destination IP address, and not the source IP address (or the source IP address has a wildcard value), the PE network device PE1 may update the VPN traffic by including the IP header information (e.g., that includes the destination IP address), and a particular source IP address (e.g., that is not indicated by the IP header information). The particular source IP address may be a pre-configured value (e.g., that is based on configuration information of the PE network device PE1).

As shown by reference number 124, the PE network device PE1 may forward the VPN traffic (e.g., after updating the VPN traffic). In some implementations, the PE network device PE1 may forward the VPN traffic to another network device associated with the entry in the first data structure. For example, the PE network device PE1 may determine, based on the label, the DT, and/or the and the reconstruction information of the entry, that the destination CE network device CE2 is associated with the entry, and may therefore forward the VPN traffic to the destination CE network device CE2. Additionally, or alternatively, the PE network device PE1 may forward the VPN traffic based on the IP header information and/or the UDP header information included in the VPN traffic. For example, the PE network device PE1 may forward, based on the destination IP address of the IP header information and/or the destination UDP address of UDP header information of the VPN traffic, the VPN traffic to the destination CE network device CE2. Accordingly, the destination CE network device CE2 may receive the VPN traffic from the PE network device PE1.

As indicated above, FIGS. 1A-1C are provided merely as one or more examples. Other examples may differ from what is described with regard to FIGS. 1A-1C.

Figure 2:
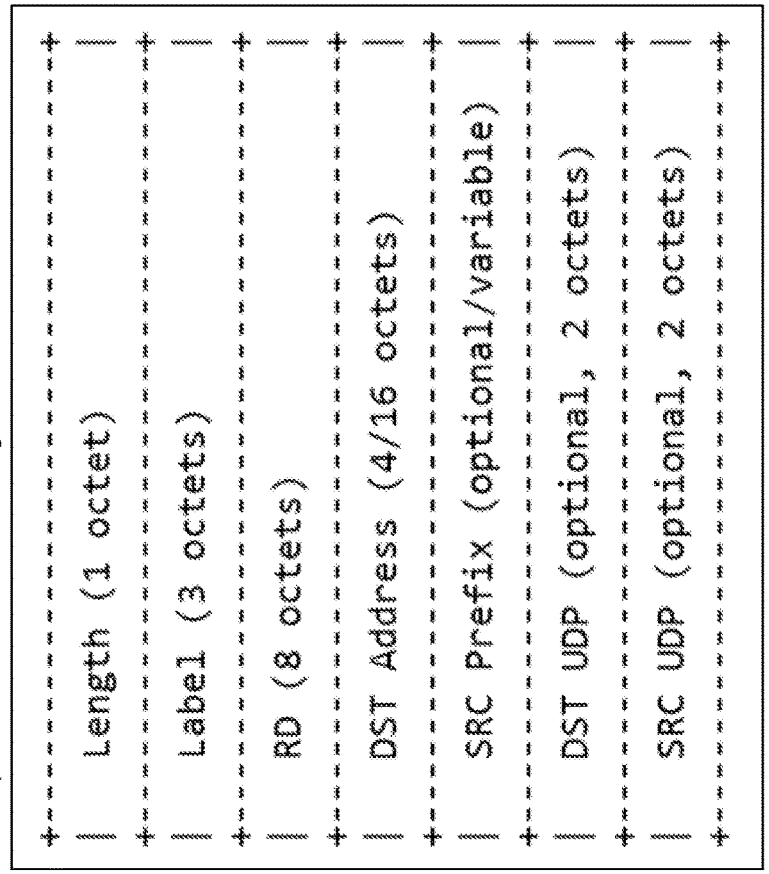
FIG. 2 is a diagram of an example advertisement message.

FIG. 2 is a diagram 200 of an example advertisement message. As shown in FIG. 2, the advertisement message may be a network layer reachability information (NLRI) message, which may include a "Length" field (e.g., that indicates a length of the advertisement message), a "Label" field (e.g., that indicates a label of the advertisement message), an "RD" field (e.g., that indicates a route distinguisher associated with the advertisement message), a "DST Address" field (e.g., that indicates a destination IP address, such as an IP address of the destination CE network device CE2), a "SRC Prefix" field (e.g., that indicates a source IP address, such as an IP address, or a prefix of the IP address, of the source CE network device CE1), a "DST UDP" field (e.g., that indicates a destination UDP address, such as a UDP port of the destination CE network device CE2), and/or a "SRC UDP" field (e.g., that indicates a source UDP address, such as a UDP port of the source CE network device CE). The DST UDP field may be present when the SRC Prefix is a host prefix (e.g., of a CE network device), accordingly the Length field may indicate at least 176 bits (22 octets, for IPv4 addresses) or 368 bits (46 octets, for IPv6 addresses). The SRC UDP field may be present when the DST UDP field is also present, accordingly the Length field may indicate at least 192 bits (24 octets, for IPv4 addresses) or 384 bits (48 octets, for IPv6 addresses).

As indicated above, FIG. 2 is provided merely as an example. Other examples may differ from what is described with regard to FIG. 2.

Figure 3:
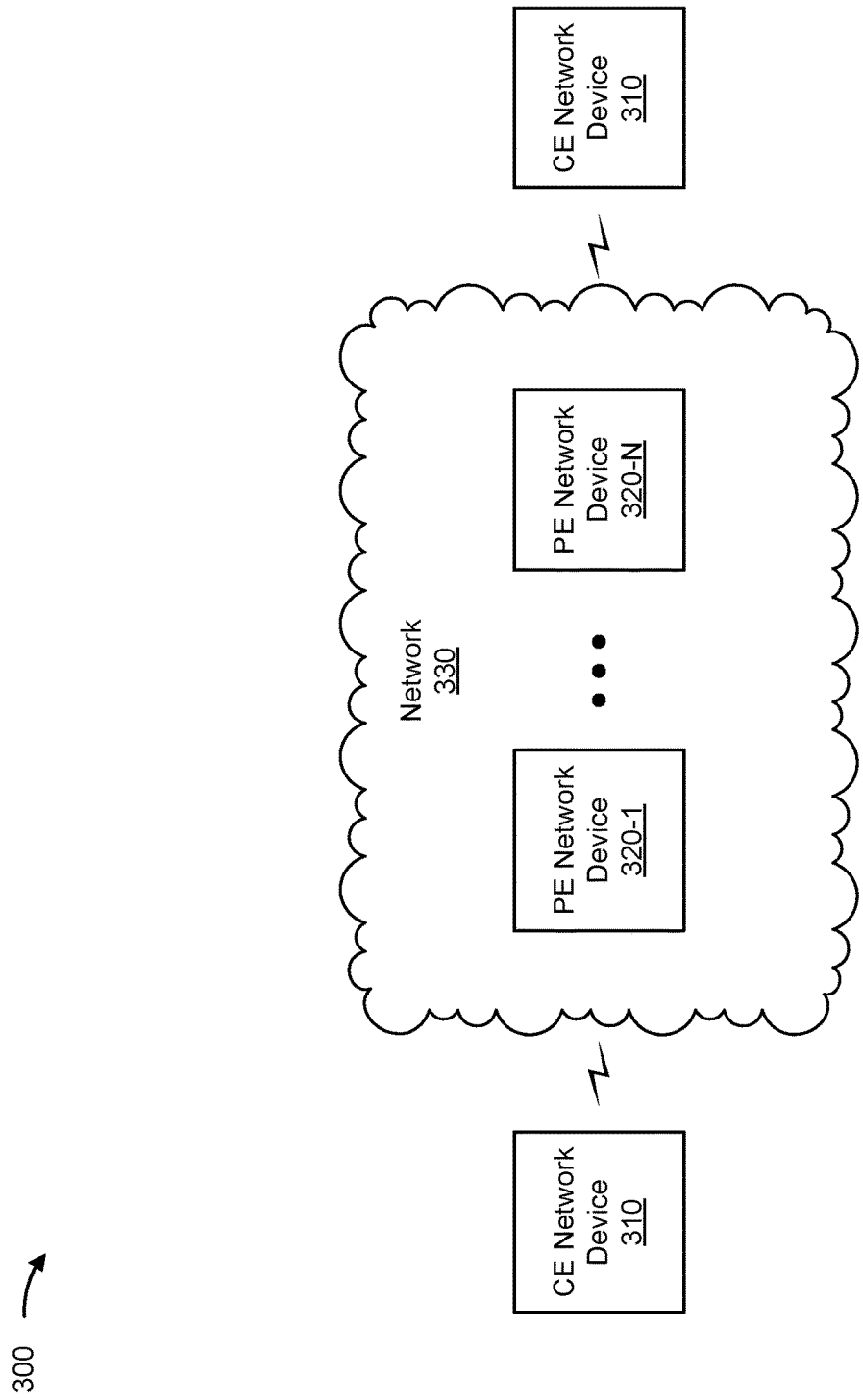
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include CE network devices 310, a plurality of PE network devices 320 (shown as PE devices 320-1 through 320-N), and a network 330. Devices of environment 300 may interconnect via wired connections, wireless connections, or a combination of wired and wireless connections.

A CE network device 310 includes one or more devices capable of generating, sending, receiving, processing, storing, routing, and/or providing traffic (e.g., VPN traffic) in a manner described herein. For example, a CE network device 310 may include a firewall, a gateway, a switch, a hub, a bridge, a reverse proxy, a server (e.g., a proxy server), a security device, an intrusion detection device, a load balancer, or a similar type of device. Additionally, or alternatively, a CE network device 310 may include a router, such as a label switching router (LSR), a label edge router (LER), an ingress router, an egress router, a provider router (e.g., a provider edge router or a provider core router), a virtual router, or another type of router. In some implementations, a CE network device 310 may include a mobile phone (e.g., a smart phone or a radiotelephone), a laptop computer, a tablet computer, a desktop computer, a handheld computer, or a similar type of device. A CE network device 310 may be connected to a PE network device 320 via a link (e.g., an uplink) of the PE network device 320. In some implementations, a CE network device 310 may transmit traffic (e.g., VPN traffic) to a PE network device 320 and receive traffic from the PE network device 320, as described elsewhere herein. A CE network device 310 may be a physical device implemented within a housing, such as a chassis. In some implementations, a CE network device 310 may be a virtual device implemented by one or more computer devices of a cloud computing environment or a data center.

A PE network device 320 includes one or more devices capable of receiving, processing, storing, routing, and/or providing traffic (e.g., VPN traffic) in a manner described herein. For example, a PE network device 320 may include a firewall, a gateway, a switch, a hub, a bridge, a reverse proxy, a server (e.g., a proxy server), a security device, an intrusion detection device, a load balancer, or a similar type of device. Additionally, or alternatively, a PE network device 320 may include a router, such as an LSR, an LER, an ingress router, an egress router, a provider router (e.g., a provider edge router or a provider core router), a virtual router, or another type of router. In some implementations, a PE network device 320 may include a link that connects the PE network device 320 to a CE network device 310. In some implementations, the PE network device 320 may transmit traffic between the CE network device 310 and the network 330, as described elsewhere herein. A PE network device 320 may be a physical device implemented within a housing, such as a chassis. In some implementations, a PE network device 320 may be a virtual device implemented by one or more computer devices of a cloud computing environment or a data center.

Network 330 includes one or more wired and/or wireless networks. For example, network 330 may include a packet switched network, a cellular network (e.g., a fifth generation (5G) network, a fourth generation (4G) network, such as a long-term evolution (LTE) network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
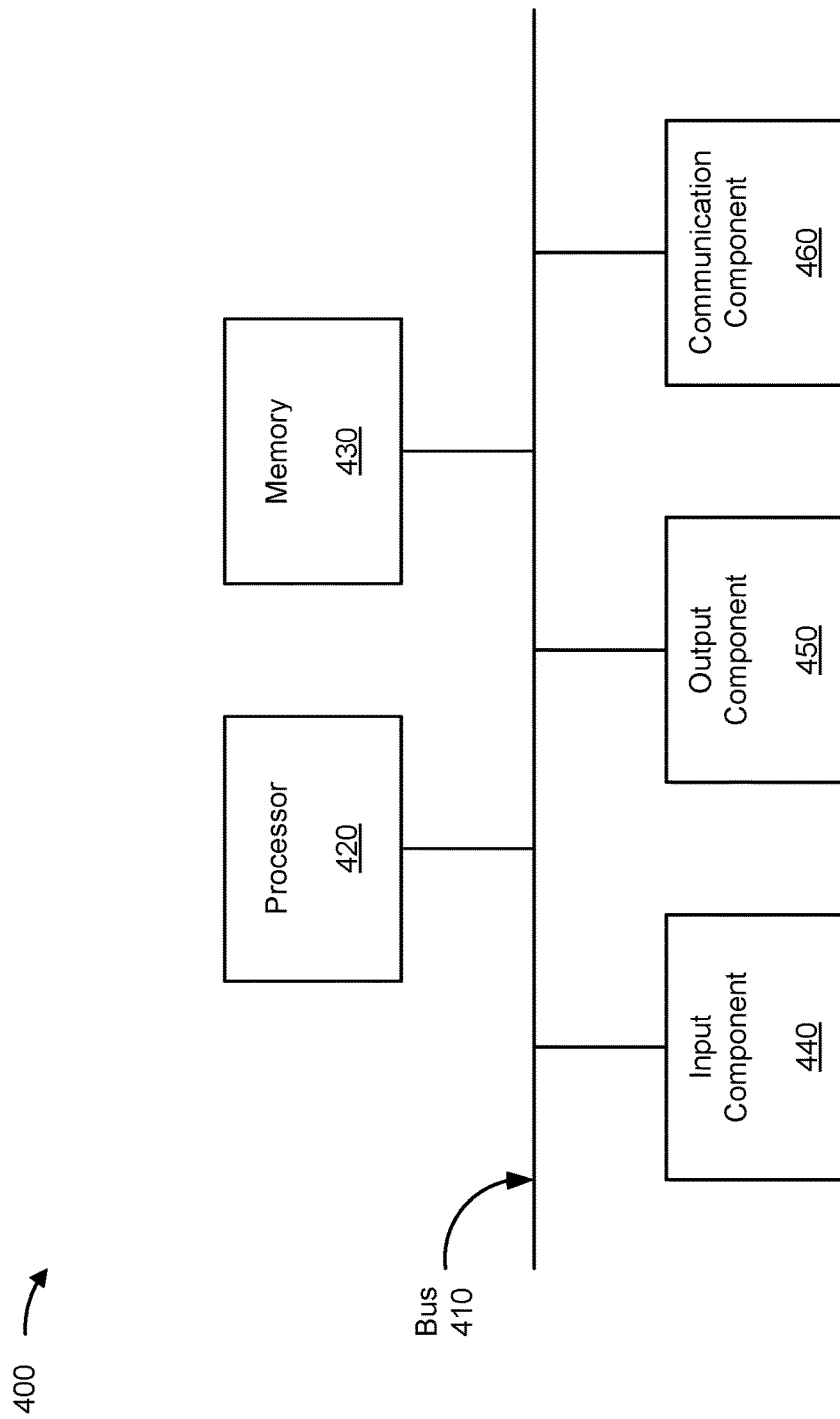
FIG. 4 is a diagram of example components of a device, which may correspond to a CE network device and/or a PE network device.

FIG. 4 is a diagram of example components of a device 400, which may correspond to a CE network device 310 and/or a PE network device 320. In some implementations, a CE network device 310 and/or a PE network device 320 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
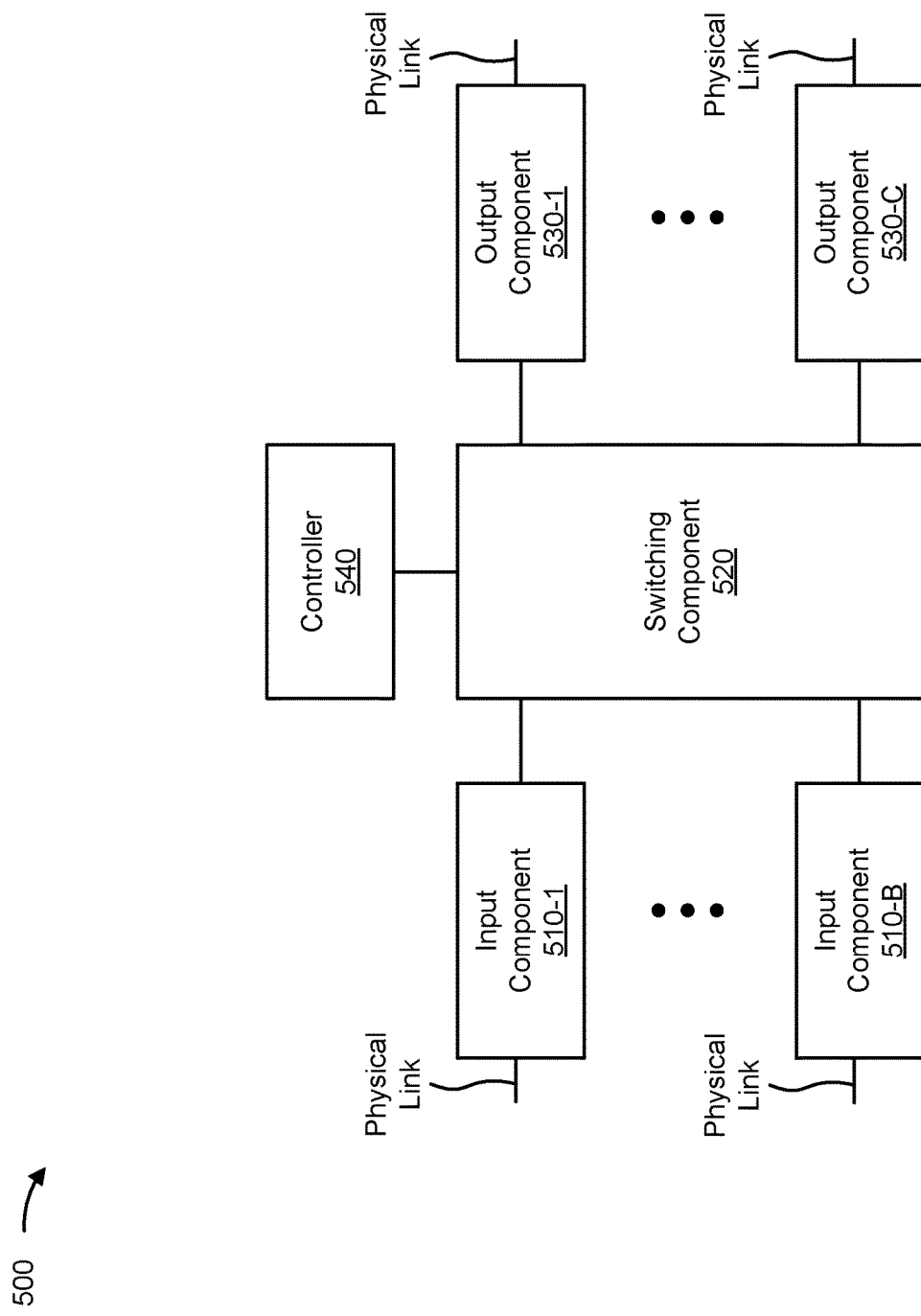
FIG. 5 is a diagram of example components of a device, which may correspond to a CE network device and/or a PE network device.

FIG. 5 is a diagram of example components of a device 500. Device 500 may correspond to CE network device 310 and/or PE network device 320. In some implementations, CE network device 310 and/or PE network device 320 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
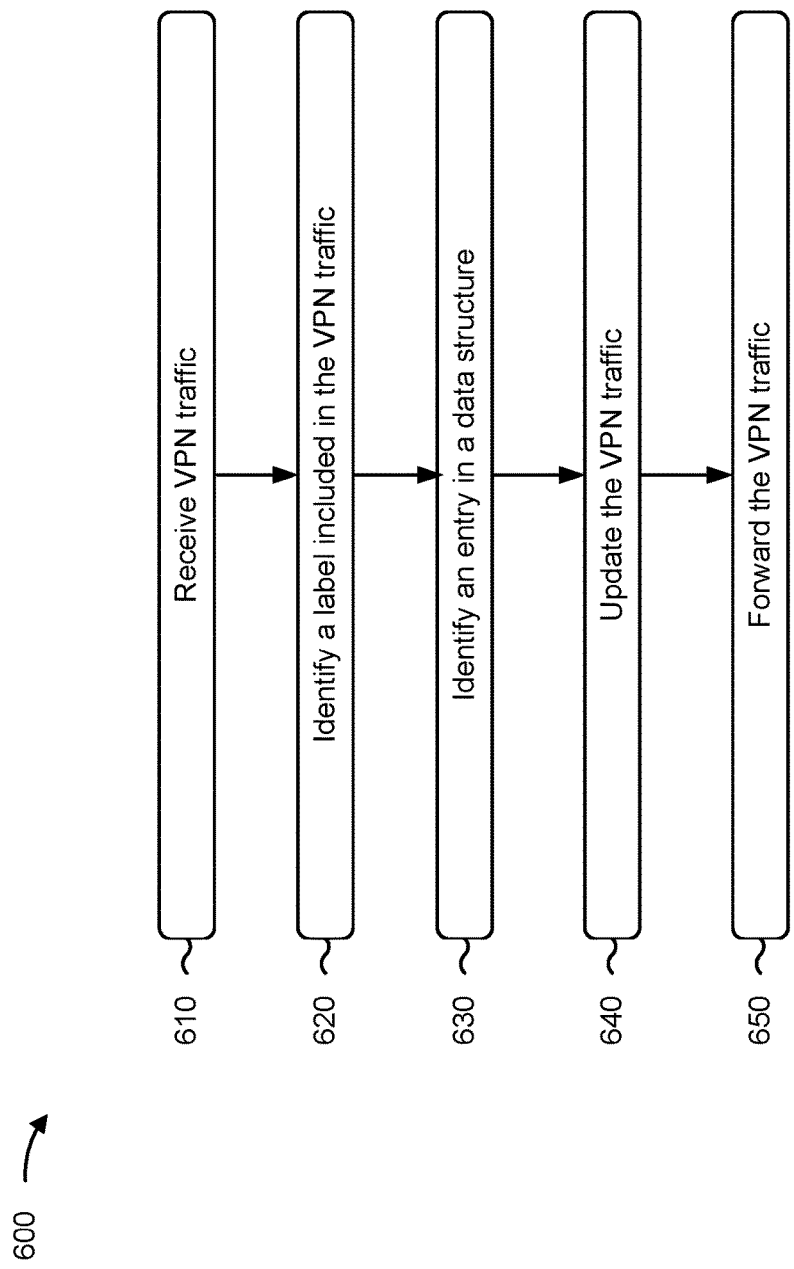

FIG. 6 is a flowchart of an example process 600 related to transport of VPN traffic with reduced header information. In some implementations, one or more process blocks of FIG. 6 are performed by a network device (e.g., a PE network device 320). In some implementations, one or more process blocks of FIG. 6 are performed by another device or a group of devices separate from or including the network device, such as another network device (e.g., a CE network device 310 or another PE network device 320). Additionally, or alternatively, one or more process blocks of FIG. 6 may be performed by one or more components of device 400, such as processor 420, memory 430, input component 440, output component 450, and/or communication component 460; one or more components of device 500, such as input component 510, switching component 520, output component 530, and/or controller 540; and/or one or more other components.

As shown in FIG. 6, process 600 may include receiving VPN traffic (block 610). For example, the network device may receive, from another network device, VPN traffic, as described above.

As further shown in FIG. 6, process 600 may include identifying a label included in the VPN traffic (block 620). For example, the network device may identify a label included in the VPN traffic, as described above.

As further shown in FIG. 6, process 600 may include identifying an entry in a data structure (block 630). For example, the network device may identify, based on the label, an entry in a data structure, as described above.

As further shown in FIG. 6, process 600 may include updating the VPN traffic (block 640). For example, the network device may update, based on the entry in the data structure, the VPN traffic, as described above. The network device may update the VPN traffic by removing at least the label from the VPN traffic, and including in the VPN traffic at least IP header information indicated by the entry.

As further shown in FIG. 6, process 600 may include forwarding the VPN traffic (block 650). For example, the network device may forward, after updating the VPN traffic and to another device, the VPN traffic, as described above.

Process 600 may include additional implementations, such as any single implementation or any combination of implementations described below and/or in connection with one or more other processes described elsewhere herein.

In a first implementation, the data structure is a virtual routing and forwarding table of the network device, or a global routing and forwarding table of the network device.

In a second implementation, alone or in combination with the first implementation, process 600 includes sending, prior to receiving the VPN traffic and to the other network device, an advertisement message, wherein the advertisement message includes the label, a route distinguisher, and traffic information that indicates at least a destination IP address, and updating the data structure to include the entry, wherein the entry includes the label, the route distinguisher, and reconstruction information that includes at least the IP header information, wherein the IP header information includes the destination IP address.

In a third implementation, alone or in combination with one or more of the first and second implementations, the traffic information includes the destination IP address and at least one of a source IP address, a source UDP address, or a destination UDP address.

In a fourth implementation, alone or in combination with one or more of the first through third implementations, updating the VPN traffic includes removing, from the VPN traffic, the label and a control word.

In a fifth implementation, alone or in combination with one or more of the first through fourth implementations, updating the VPN traffic includes including, in the VPN traffic, the IP header information indicated by the entry and UDP header information indicated by the entry.

In a sixth implementation, alone or in combination with one or more of the first through fifth implementations, updating the VPN traffic includes including, in the VPN traffic, at least one of a particular source IP address and a particular source UDP address, wherein each of the particular source IP address and the particular source UDP address are not indicated by the entry.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
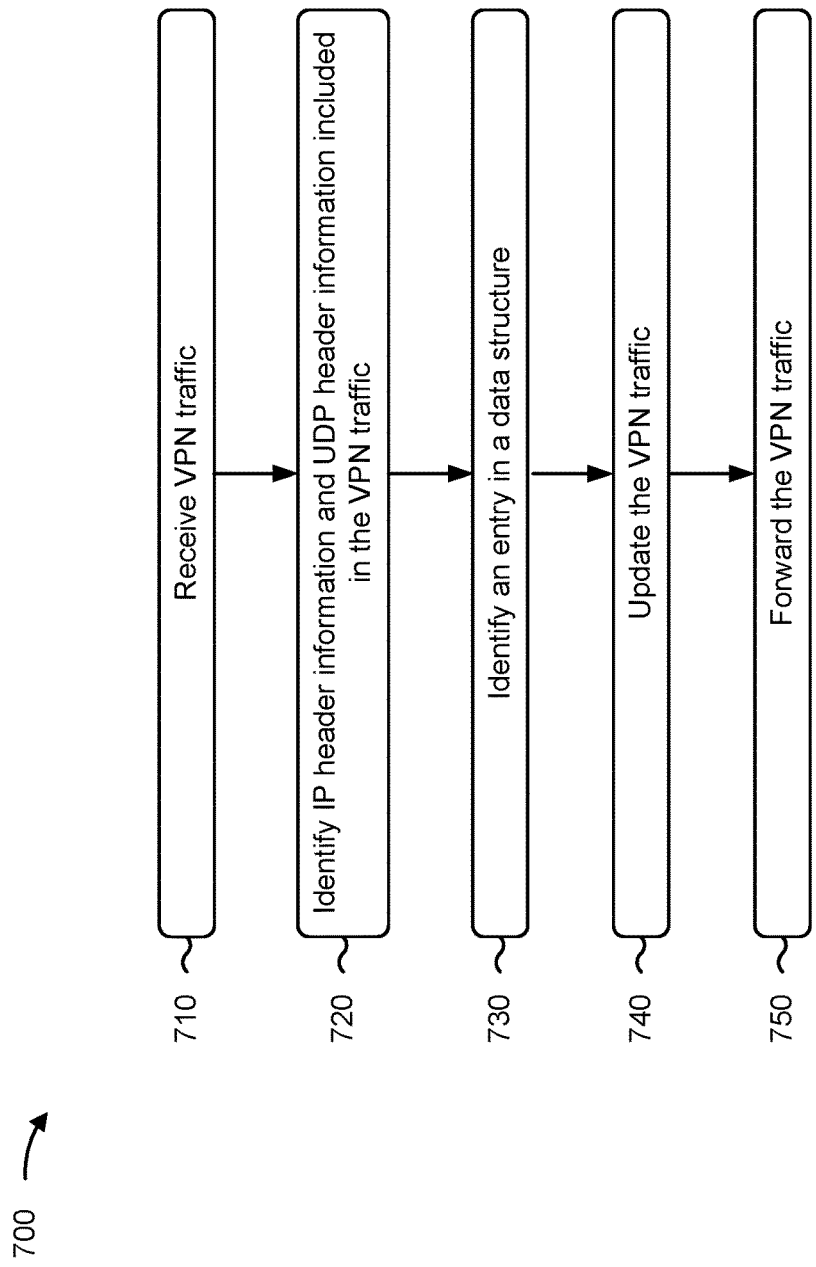

FIG. 7 is a flowchart of an example process 700 related to transport of VPN traffic with reduced header information. In some implementations, one or more process blocks of FIG.

7 are performed by a network device (e.g., a PE network device 320). In some implementations, one or more process blocks of FIG. 7 are performed by another device or a group of devices separate from or including the network device, such as another network device (e.g., a CE network device 310 or another PE network device 320). Additionally, or alternatively, one or more process blocks of FIG. 7 may be performed by one or more components of device 400, such as processor 420, memory 430, input component 440, output component 450, and/or communication component 460; one or more components of device 500, such as input component 510, switching component 520, output component 530, and/or controller 540; and/or one or more other components.

As shown in FIG. 7, process 700 may include receiving VPN traffic (block 710). For example, the network device may receive, from another network device, virtual private network (VPN) traffic, as described above.

As further shown in FIG. 7, process 700 may include identifying IP header information and UDP header information included in the VPN traffic (block 720). For example, the network device may identify IP header information and UDP header information included in the VPN traffic, as described above.

As further shown in FIG. 7, process 700 may include identifying an entry in a data structure (block 730). For example, the network device may identify, based on the IP header information and the UDP header information, an entry in a data structure, as described above.

As further shown in FIG. 7, process 700 may include updating the VPN traffic (block 740). For example, the network device may update, based on the entry in the data structure, the VPN traffic, as described above. The network device may update the VPN traffic by removing at least the IP header information from the VPN traffic, and including at least a label indicated by the entry in the VPN traffic.

As further shown in FIG. 7, process 700 may include forwarding the VPN traffic (block 750). For example, the network device may forward, after updating the VPN traffic and to another network associated with the entry, the VPN traffic, as described above.

Process 700 may include additional implementations, such as any single implementation or any combination of implementations described below and/or in connection with one or more other processes described elsewhere herein.

In a first implementation, the data structure is a virtual routing and forwarding table of the network device, or a global routing and forwarding table of the network device.

In a second implementation, alone or in combination with the first implementation, process 700 includes receiving, prior to receiving the VPN traffic, an advertisement message from the other network device, wherein the advertisement message includes the label, a route distinguisher, and traffic information that indicates at least a destination IP address, and updating, based on the advertisement message, the data structure to include the entry, wherein the entry includes the label, the route distinguisher, and the traffic information.

In a third implementation, alone or in combination with one or more of the first and second implementations, the traffic information includes the destination IP address and at least one of a source IP address, a source UDP address, or a destination UDP address.

In a fourth implementation, alone or in combination with one or more of the first through third implementations, updating the VPN traffic includes including, in the VPN traffic, the label indicated by the entry and a control word.

In a fifth implementation, alone or in combination with one or more of the first through fourth implementations, updating the VPN traffic includes removing, from the VPN traffic, the IP header information and the UDP header information.

In a sixth implementation, alone or in combination with one or more of the first through fifth implementations, updating the VPN traffic includes identifying traffic information included in the entry, determining that the traffic information includes at least one of a source UDP address or a destination UDP address, and removing, from the VPN traffic and based on determining that the traffic information includes at least one of the source UDP address or the destination UDP address, the IP header information and the UDP header information.

In a seventh implementation, alone or in combination with one or more of the first through sixth implementations, updating the VPN traffic includes identifying traffic information included in the entry, determining that the traffic information does not include a source UDP address and a destination UDP address, and removing, from the VPN traffic and based on determining that the traffic information does not include a source UDP address and a destination UDP address, the IP header information.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Figure 8:
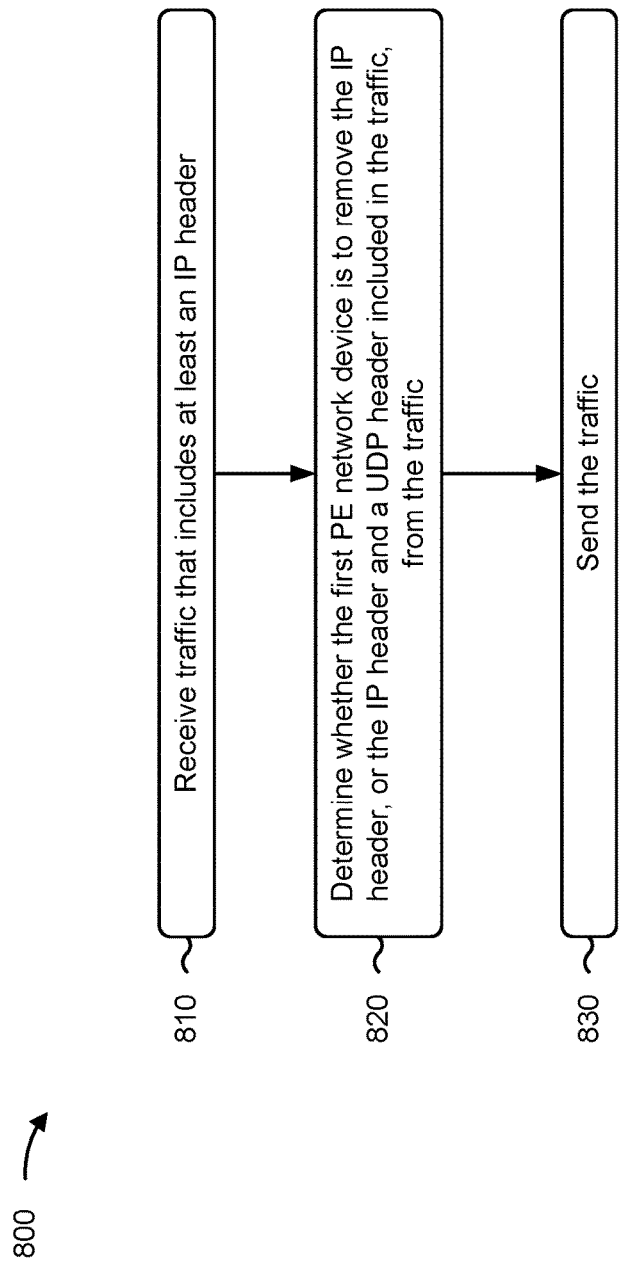

FIG. 8 is a flowchart of an example process 800 related to transport of VPN traffic with reduced header information. In some implementations, one or more process blocks of FIG. 8 are performed by a first PE network device (e.g., a PE network device 320) associated with a VPN. In some implementations, one or more process blocks of FIG. 8 are performed by another device or a group of devices separate from or including the network device, such as another network device (e.g., a CE network device 310 or another PE network device 320). Additionally, or alternatively, one or more process blocks of FIG. 8 may be performed by one or more components of device 400, such as processor 420, memory 430, input component 440, output component 450, and/or communication component 460; one or more components of device 500, such as input component 510, switching component 520, output component 530, and/or controller 540; and/or one or more other components.

As shown in FIG. 8, process 800 may include receiving traffic that includes at least an IP header (block 810). For example, the first PE network device may receive, from a first CE network device, traffic that includes at least an IP header, as described above.

As further shown in FIG. 8, process 800 may include determining whether the first PE network device is to remove the IP header, or the IP header and a UDP header included in the traffic, from the traffic (block 820). For example, the first PE network device may determine whether the first PE network device is to remove the IP header, or the IP header and a UDP header included in the traffic, from the traffic, as described above.

As further shown in FIG. 8, process 800 may include sending the traffic (block 830). For example, the first PE network device may send, to one or more second PE network devices, the traffic, as described above. In some implementations, the first PE network device, prior to sending the traffic, updates the traffic by removing the IP header, or the IP header and the UDP header, when the first PE network device makes a removal determination. In some implementations, the first PE network device, prior to sending the traffic, does not update the traffic when the first PE network device does not make a removal determination.

Process 800 may include additional implementations, such as any single implementation or any combination of implementations described below and/or in connection with one or more other processes described elsewhere herein.

In a first implementation, the traffic, after the first PE network device updates the traffic, includes an MPLS label stack, wherein an inner label of the MPLS label stack is for regeneration of a new IP header, or a new IP header and a new UDP header, by a PE network device that receives the traffic.

In a second implementation, alone or in combination with the first implementation, the first PE network device determined the inner label that is included in the MPLS label stack based on an advertisement received from at least one of the one or more second PE network devices or a controller.

In a third implementation, alone or in combination with one or more of the first and second implementations, the advertisement includes the inner label and traffic information, wherein the traffic information includes at least one of a destination IP address, a source IP address, destination UDP port, or source UDP port.

In a fourth implementation, alone or in combination with one or more of the first through third implementations, process 800 includes updating a data structure for the VPN to include an entry that includes the inner label and the traffic information.

In a fifth implementation, alone or in combination with one or more of the first through fourth implementations, determining whether the first PE network device is to remove the IP header, or the IP header and the UDP header included in the traffic, from the traffic includes determining, based on the IP header, or the IP header and the UDP header, whether a data structure for the VPN includes an entry, and determining that the first PE network device is to removing the IP header, or the IP header and the UDP header, included in the traffic based on determining that the data structure includes an entry, not remove the IP header, or the IP header and the UDP header, included in the traffic based on determining that the data structure does not include an entry.

Although FIG. 8 shows example blocks of process 800, in some implementations, process 800 includes additional blocks, fewer blocks, different blocks, or differently arranged blocks than those depicted in FIG. 8. Additionally, or alternatively, two or more of the blocks of process 800 may be performed in parallel.

FIG. 9 is a flowchart of an example process 900 related to transport of VPN traffic with reduced header information. In some implementations, one or more process blocks of FIG. 9 are performed by a first PE network device (e.g., a PE network device 320) associated with a VPN. In some implementations, one or more process blocks of FIG. 9 are performed by another device or a group of devices separate from or including the network device, such as another network device (e.g., a CE network device 310 or another PE network device 320). Additionally, or alternatively, one or more process blocks of FIG. 9 may be performed by one or more components of device 400, such as processor 420, memory 430, input component 440, output component 450, and/or communication component 460; one or more components of device 500, such as input component 510, switching component 520, output component 530, and/or controller 540; and/or one or more other components.

As shown in FIG. 9, process 900 may include receiving traffic that includes an MPLS label stack (block 910). For example, the first PE network device may receive, from a second PE network device, traffic that includes an MPLS label stack, as described above.

As further shown in FIG. 9, process 900 may include regenerating an IP header or an IP header and a UDP header (block 920). For example, the first PE network device may regenerate, based on an inner label of the MPLS label stack, an IP header, or an IP header and a UDP header, as described above.

As further shown in FIG. 9, process 900 may include sending the traffic with the IP header, or the IP header and the UDP header, included in the traffic (block 930). For example, the first PE network device may send, to a CE network device, the traffic with the IP header, or the IP header and the UDP header, included in the traffic, as described above.

Process 900 may include additional implementations, such as any single implementation or any combination of implementations described below and/or in connection with one or more other processes described elsewhere herein.

In a first implementation, process 900 includes sending, to the second PE network device and prior to receiving the traffic, an advertisement, wherein the advertisement includes the inner label and traffic information.

In a second implementation, alone or in combination with the first implementation, the traffic information includes at least one of a destination IP address, a source IP address, destination UDP port, or source UDP port.

In a third implementation, alone or in combination with one or more of the first and second implementations, process 900 includes updating a data structure for the VPN to include an entry that includes the inner label and the traffic information.

In a fourth implementation, alone or in combination with one or more of the first through third implementations, process 900 includes receiving, from a controller and prior to receiving the traffic, an advertisement, wherein the advertisement includes the inner label and traffic information.

In a fifth implementation, alone or in combination with one or more of the first through fourth implementations, process 900 includes updating a data structure for the VPN to include an entry that includes the inner label and the traffic information.

In a sixth implementation, alone or in combination with one or more of the first through fifth implementations, regenerating the IP header, or the IP header and the UDP header, includes identifying, based on the inner label of the MPLS label stack, an entry in a data structure for the VPN, and regenerating, based on the entry, the IP header, or the IP header and the UDP header.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first provider edge (PE) network device associated with a virtual private network (VPN) and from a first customer edge (CE) network device, traffic that includes at least an Internet Protocol (IP) header;
   determining, by the first PE network device, whether the first PE network device is to remove the IP header, or the IP header and a user datagram protocol (UDP) header included in the traffic; and
   sending, by the first PE network device and to one or more second PE network devices, the traffic,
      wherein the first PE network device, prior to sending the traffic, updates the traffic by removing the IP header, or the IP header and the UDP header, when the first PE network device makes a removal determination,
      wherein a label associated with the IP header or the UDP header is included in the traffic upon the removal determination, and
      wherein the first PE network device, prior to sending the traffic, does not update the traffic when the first PE network device does not make a removal determination.

2. The method of claim 1, wherein the traffic, after the first PE network device updates the traffic, includes a multiprotocol label switching (MPLS) label stack,
   wherein an inner label of the MPLS label stack is for regeneration of a new IP header, or a new IP header and a new UDP header, by a PE network device that receives the traffic.

3. The method of claim 2, wherein the first PE network device determined the inner label that is included in the MPLS label stack based on an advertisement received from at least one of the one or more second PE network devices or a controller.

4. The method of claim 3, wherein the advertisement includes the inner label and traffic information,
   wherein the traffic information includes at least one of a destination IP address, a source IP address, destination UDP port, or source UDP port.

5. The method of claim 4, further comprising:
   updating a data structure for the VPN to include an entry that includes the inner label and the traffic information.

6. The method of claim 1, wherein determining whether the first PE network device is to remove the IP header, or the IP header and the UDP header included in the traffic, from the traffic includes:
   determining, based on the IP header, or the IP header and the UDP header, whether a data structure for the VPN includes an entry; and
   determining that the first PE network device is to:
      remove the IP header, or the IP header and the UDP header, included in the traffic based on determining that the data structure includes an entry,
      not remove the IP header, or the IP header and the UDP header, included in the traffic based on determining that the data structure does not include an entry.

7. A method, comprising:
   receiving, by a first provider edge (PE) network device associated with a virtual private network (VPN) and from a second PE network device, traffic that includes a multiprotocol label switching (MPLS) label stack,
      wherein the MPLS label stack includes an inner label that is included based on a header being removed from the traffic, and
      wherein the header is removed prior to receiving the traffic;
   regenerating, by the first PE network device and based on the inner label of the MPLS label stack, an Internet Protocol (IP) header, or an IP header and a user datagram protocol (UDP) header; and
   sending, to a customer edge (CE) network device, the traffic with the IP header, or the IP header and the UDP header, included in the traffic.

8. The method of claim 7, further comprising:
   sending, to the second PE network device and prior to receiving the traffic, an advertisement,
      wherein the advertisement includes the inner label and traffic information.

9. The method of claim 8, wherein the traffic information includes at least one of a destination IP address, a source IP address, destination UDP port, or source UDP port.

10. The method of claim 9, further comprising:
updating a data structure for the VPN to include an entry that includes the inner label and the traffic information.

11. The method of claim 8, further comprising:
receiving, from a controller and prior to receiving the traffic, an advertisement,
wherein the advertisement includes the inner label and traffic information.

12. The method of claim 11, further comprising:
updating a data structure for the VPN to include an entry that includes the inner label and the traffic information.

13. The method of claim 7, wherein regenerating the IP header, or the IP header and the UDP header, includes:
identifying, based on the inner label of the MPLS label stack, an entry in a data structure for the VPN; and
regenerating, based on the entry, the IP header, or the IP header and the UDP header.

14. A first provider edge (PE) network device associated with a virtual private network (VPN), comprising:
one or more memories; and
one or more processors to:
receive, from a first customer edge (CE) network device, traffic that includes at least an Internet protocol (IP) header;
determine whether the first PE network device is to remove the IP header, or the IP header and a user datagram protocol (UDP) header included in the traffic, from the traffic; and
send, to one or more second PE network devices, the traffic,
wherein the first PE network device, prior to sending the traffic, updates the traffic by removing the IP header, or the IP header and a UDP header, when the first PE network device makes a removal determination,
wherein a label associated with the IP header of the UDP header is included in the traffic upon the removal determination, and
wherein the first PE network device, prior to sending the traffic, does not update the traffic when the first PE network device does not make a removal determination.

15. The first PE network device of claim 14, wherein the traffic, after the first PE network device updates the traffic, includes a multiprotocol label switching (MPLS) label stack,
wherein an inner label of the MPLS label stack is for regeneration of a new IP header, or a new IP header and a new UDP header, by a PE network device that receives the traffic.

16. The first PE network device of claim 15, wherein the first PE network device determined the inner label that is included in the MPLS label stack based on an advertisement received from at least one of the one or more second PE network devices or a controller.

17. The first PE network device of claim 16, wherein the advertisement includes the inner label and traffic information.

18. The first PE network device of claim 17, wherein the traffic information includes at least one of a destination IP address, a source IP address, destination UDP port, or source UDP port.

19. The first PE network device of claim 17, wherein the one or more processors are further to:
update a data structure for the VPN to include an entry that includes the inner label and the traffic information.

20. The first PE network device of claim 14, wherein the one or more processors, to determine whether the first PE network device is to remove the IP header, or the IP header and the UDP header included in the traffic, from the traffic, are to:
determine, based on the IP header, or the IP header and the UDP header, whether a data structure for the VPN includes an entry; and
determine that the first PE network device is to:
remove the IP header, or the IP header and the UDP header, included in the traffic based on determining that the data structure includes an entry,
not remove the IP header, or the IP header and the UDP header, included in the traffic based on determining that the data structure does not include an entry.

* * * * *